United States Patent
Shoblom et al.

(10) Patent No.: US 12,353,277 B1
(45) Date of Patent: Jul. 8, 2025

(54) DETERMINING COMMONALITIES IN DEVICES BY USING A CHI-SQUARED STATISTICAL TEST

(71) Applicant: Riverbed Technology LLC, Redwood City, CA (US)

(72) Inventors: Nicole Andree M. Shoblom, Bentonville, AR (US); Erez Shalom Armoza, Espinhal (PT); Robyn A. Zamora, Sorrento, FL (US); Karthikeyan Thennamanallur Ponnusamy, Westford, MA (US); Christopher O'Malley, Waterloo (CA)

(73) Assignee: RIVERBED TECHNOLOGY LLC, Redwood City, CA (US)

( * ) Notice: Subject to any disclaimer, the term of this patent is extended or adjusted under 35 U.S.C. 154(b) by 19 days.

(21) Appl. No.: 18/459,137

(22) Filed: Aug. 31, 2023

(51) Int. Cl.
*G06F 11/00* (2006.01)
*G06F 11/07* (2006.01)
*G06F 17/18* (2006.01)

(52) U.S. Cl.
CPC ........ *G06F 11/079* (2013.01); *G06F 11/0709* (2013.01); *G06F 17/18* (2013.01)

(58) Field of Classification Search
CPC .... G06F 11/108; G06F 11/1096; G06F 12/02; G06F 11/079; G06F 11/0709
USPC ...................................... 714/1–57
See application file for complete search history.

(56) References Cited

U.S. PATENT DOCUMENTS

| | | | | |
|---|---|---|---|---|
| 2013/0097465 A1* | 4/2013 | Eslambolchi | ........ | H04Q 3/0062 714/57 |
| 2016/0041899 A1* | 2/2016 | Cragun | ............... | G06F 11/3668 714/38.1 |
| 2023/0153191 A1* | 5/2023 | Gennetten | ........... | G06F 11/0751 714/57 |
| 2023/0267074 A1* | 8/2023 | Balasubramanian | ........ | G06F 11/3684 714/38.1 |

\* cited by examiner

*Primary Examiner* — Sarai E Butler
(74) *Attorney, Agent, or Firm* — Park, Vaughan, Fleming & Dowler, LLP.; Laxman Sahasrabuddhe (57) ABSTRACT

A set of devices may be monitored and a subset of the set of devices which is experiencing a problem may be determined. A cardinality of the subset of the set of devices may be divided by a cardinality of the set of devices to obtain a ratio. An expected distribution over a set of attribute values may be determined by multiplying the ratio with a count of devices corresponding to each attribute value. An observed distribution over the set of attribute values may be determined by counting devices which are experiencing the problem corresponding to each attribute value. A probability value may be determined which represents a probability that the expected distribution matches the observed distribution. A report may be generated which includes attributes and the associated probability values, where an attribute is included in the report if the corresponding probability is less than a threshold.

17 Claims, 8 Drawing Sheets

| Attribute 402 DEVICE_MANUFACTURER | TOTAL | EXP | OBS |
|---|---|---|---|
| HP | 21326 | 142 | 148 |
| Hewlett-Packard | 752 | 5 | 3 |
| Dell Inc. | 168 | 1 | 0 |
| Apple | 164 | 1 | 0 |
| Other | 128 | 1 | 0 |
| VMware, Inc. | 67 | 0 | 0 |
| LENOVO | 20 | 0 | 0 |
| ASUS | 6 | 0 | 0 |
| Gigabyte Technology Co., Ltd. | 2 | 0 | 0 |

Attribute values 404

FIG. 4A

Attribute 452

456 458 460

| DEVICE_MODEL | TOTAL | EXP | OBS |
|---|---|---|---|
| HP EliteBook 840 G6 | 5251 | 39 | 0 |
| HP EliteBook 840 G5 | 4775 | 36 | 13 |
| HP EliteDesk 800 G5 SFF | 2177 | 16 | 0 |
| HP EliteDesk 800 G4 SFF | 2085 | 16 | 4 |
| HP EliteDesk 800 G3 SFF | 1362 | 10 | 4 |
| HP EliteBook 840 G3 | 631 | 5 | 0 |
| HP EliteBook 745 G6 | 626 | 5 | 1 |
| HP ZBook Studio G5 | 618 | 5 | 1 |
| HP EliteDesk 800 G2 SFF | 468 | 4 | 112 |

Attribute values 454

| ATTRIBUTE | PVAL | VALUE | TOTAL | EXP | OBS |
|---|---|---|---|---|---|
| DEVICE_MODEL | 3.353453e-311 | HP EliteDesk 800 G2 SFF | 468 | 3 | 112 |
| DEVICE_MODEL | 3.353453e-311 | HP EliteDesk 800 G4 DM 35W | 188 | 1 | 3 |
| OS_DISK_TYPE | 5.632535e-146 | HDD-7200 | 966 | 6 | 69 |
| DEVICE_CPU_MODEL | 2.960216e-142 | Intel(R) Core(TM) i5-6500 CPU @ 3.20GHz | 588 | 4 | 70 |
| DEVICE_CPU_MODEL | 2.960216e-142 | Intel(R) Core(TM) i7-6700 CPU @ 3.40GHz | 664 | 4 | 46 |
| DEVICE_CPU_MODEL | 2.960216e-142 | Intel(R) Core(TM) i7-8700T CPU @ 2.40GHz | 205 | 1 | 3 |
| DEVICE_CPU_FREQUENCY | 2.357459e-77 | 3GHz to 3.5GHz | 4375 | 29 | 123 |
| BUSINESS_LOCATION | 2.409732e-58 | | 1804 | 7 | 55 |
| BUSINESS_LOCATION | 2.409732e-58 | | 1799 | 7 | 25 |
| BUSINESS_LOCATION | 2.409732e-58 | | 2852 | 10 | 17 |

DETERMINING COMMONALITIES IN DEVICES BY USING A CHI-SQUARED STATISTICAL TEST

TECHNICAL FIELD

This disclosure generally relates to computer systems and networks. More specifically, this disclosure relates to determining commonalities in devices by using a chi-squared statistical test.

BACKGROUND

A computing infrastructure may refer to a collection of computers and networks used by an organization. Numerous objects (which may include, but are not limited to, users, devices, applications, and networks) may be monitored and a variety of metrics may be collected for each monitored object. It is important to identify and fix problems in a computing infrastructure.

SUMMARY

A set of devices may be monitored in a computing infrastructure. A subset of the set of devices may be determined which is experiencing a problem based on the monitoring. A cardinality of the subset of the set of devices may be divided by a cardinality of the set of devices to obtain a ratio. An expected distribution over a set of attribute values of an attribute may be determined by multiplying the ratio with a count of devices in the set of devices corresponding to each attribute value in the set of attribute values. An observed distribution over the set of attribute values of the attribute may be determined by counting devices corresponding to each attribute value in the set of attribute values which are experiencing the problem. A probability value may be determined which represents a probability that the expected distribution matches the observed distribution. A report which includes one or more attributes that are likely to be root causes of the problem may be generated, where an attribute is included in the report when the probability value corresponding to the attribute is less than a threshold.

The probability of the expected distribution matching the observed distribution may be determined by computing a p-value for a chi-squared hypothesis test based on the expected distribution and the observed distribution.

The attribute of a device may include, but is not limited to, a manufacturer of the device, a model of the device, a count of processor cores in the device, a clock frequency of a processor in the device, a processor model of a processor in the device, a type of memory used in the device, an amount of memory used in the device, a type of software used in the device, a version of a software used in the device, a type of disk drive used in the device, a location of the device, an organization name which owns the device, a duration since a most recent reboot of the device, a network address of the device, a network domain of the device, and a type of network connected to the device.

Counting the devices corresponding to each attribute value in the set of attribute values which are experiencing the problem may include counting a first device multiple times when the first device is associated with multiple attribute values of a dynamic attribute of the first device.

Generating the report may include ranking the one or more attributes in order of increasing probability values corresponding to the one or more attributes.

The report may include an attribute value for a given attribute when a difference between a first count of devices having the attribute value which experienced the problem and a second count of devices having the attribute value which were expected to experience the problem is positive.

Generating the report may include ranking the one or more attribute values in order of decreasing differences corresponding to the one or more attribute values.

A first shape and a second shape may be displayed, where a first area of the first shape is proportional to a first count of devices experiencing the problem, wherein a second area of the second shape is proportional to a second count of devices which have a given attribute value of the attribute, and wherein a third area of an overlap between the first shape and the second shape is proportional to a third count of devices which are experiencing the problem and have the given attribute value.

DETAILED DESCRIPTION

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

Figure 1:
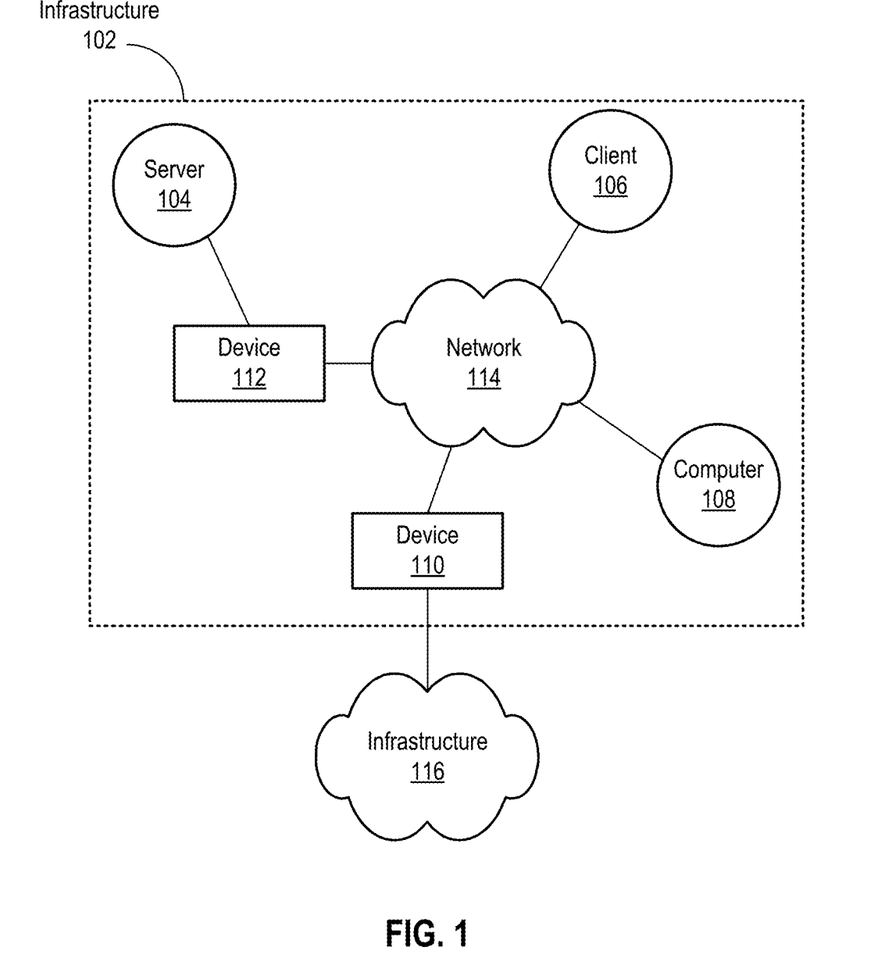
FIG. 1 illustrates a computing infrastructure in accordance with some embodiments described herein.

FIG. 1 illustrates a computing infrastructure in accordance with some embodiments described herein. Examples of computing infrastructures include, but are not limited to, information technology (IT) infrastructures, server farms, and data centers.

Computing infrastructure 102 may include server 104, client 106, computer 108, and devices 110 and 112, which may communicate with one another over network 114. Computing infrastructure 102 may be communicatively coupled with other computing infrastructures, e.g., computing infrastructure 102 may be communicatively coupled with computing infrastructure 116 through device 110. The computing infrastructure shown in FIG. 1 is for illustration purposes and is not intended to limit the scope of the disclosure. In general, a computing infrastructure may include thousands or millions of devices.

The term "device" may generally refer to any apparatus that can perform computations and communicate with other devices. In some embodiments, a device can include a processing mechanism that can execute instructions stored on a storage medium. Examples of devices include, but are not limited to, file servers, appliances, routers, switches, smartphones, handheld computers, laptop computers, desktop computers, distributed computers, and printers.

The term "network" may refer to multiple interconnected devices. A network can deliver information from one device (e.g., a server) to another device (e.g., a client computer). Examples of networks include, but are not limited to, wireless and wired networks, local area networks (LANs), metropolitan area networks (MANs), WANs, private networks, public networks, intranets, and internets.

Communication between two devices or nodes of a network is typically accomplished using a layered software architecture, which is often referred to as a networking software stack or a networking stack. A given functionality in a networking stack can be implemented using hardware or software or a combination thereof. The decision to implement a specific functionality in hardware or software is typically based on a tradeoff between performance and cost.

Each layer in a networking stack may be associated with one or more protocols which define the rules and conventions for processing packets in that layer. Each lower layer may perform a service for the layer immediately above it to help with processing packets, and each layer may add a header (control data) that allows peer layers to communicate with one another. At the sender, each layer may add layer specific headers to the packet as the packet moves from higher layers to lower layers. The receiver may process headers of each layer as the payload moves from the lowest layer to the highest layer.

A data link layer or link layer may refer to a layer that manages a communication channel between adjacent devices in the network. For example, if two routers are connected to each other via a cable, then the link layer may manage the communication channel between these two routers. Ethernet is an example of a link layer. A network layer may refer to a layer that enables communication between any two devices across the network. Internet Protocol (IP) layer is an example of a network layer that enables communication between two routers in an IP network.

Many performance metrics may be collected in a computing infrastructure. It is desirable to identify the root cause of problems or errors in a computing infrastructure. A report that includes many possible root causes may cause information overload and alert fatigue. Embodiments described herein can reduce the burden and bring focus to a small subset of root causes that have the highest probability of including the actual root causes. In addition, embodiments described herein may provide a human operator with a convenient starting point for further investigations of the root cause(s).

End user digital experience issues such as slow application response times, blue screens of death, application crashes, web page loading errors, high latency, high CPU usage, etc., adversely impact users' ability to perform their jobs seamlessly within an enterprise. Therefore, IT teams, digital experience teams, and internal digital product teams place high importance on root causing digital experience issues. Agents (which may refer to software code which executes on a processor and which is intended to collect performance and/or operational data) may be installed on end user devices to detect which devices are experiencing digital issues. Such agents may collect information for a plurality of attributes about each end user device. Examples of attributes for which information may be collected include, but are not limited to, a device's location, whether the device is connected through a virtual private network (VPN), the last time the device was rebooted, the device's manufacturer, and the device's operating system.

Determining the root cause may include performing commonalities analysis, i.e., determining which attributes are common across impacted devices. The challenge in commonalities analysis is determining insightful commonalities that are actionable. For example, it would not be useful to surface the device manufacturer as a commonality if impacted devices are mostly from a specific device vendor, and all devices of interest in the computing infrastructure are also from the specific device vendor. The term "surface" is used in this disclosure to refer to selecting, reporting, and/or highlighting a specific attribute of a device as an insightful and actionable commonality across the impacted devices. Thus, the phrase "surface the device manufacturer" in the sentence above may refer to reporting the device manufacturer attribute from a set of attributes as a particularly insightful and actionable commonality across the impacted devices.

A first approach for performing commonality analysis is to sort attribute values by the number of impacted devices in descending order and show the customers the top attribute values (e.g., the top 3 or 5). Such approaches often surface attribute values that are not useful, i.e., the surfaced attribute values do not identify the root cause(s). For example, if all or most devices are manufactured by a specific manufacturer, then this approach may incorrectly surface the device manufacturer as the root cause.

A second approach is to compare the ratio of impacted devices which have a specific attribute value to the overall ratio of impacted devices across the computing infrastructure. In this approach, if the ratio of impacted devices which have a specific attribute value has a lift greater than or equal to a threshold level (e.g., 25%) over the overall impacted device ratio, then the attribute value may be surfaced as an actionable commonality. The term "lift" is used in this disclosure to indicate an increase in value. Thus, a lift of greater than or equal to 25% means that the increase in value (with respect to a base value) is greater than or equal to 25%. The second approach may be better than the first approach for identifying root causes, but a drawback of the second approach is that it uses a fixed lift threshold which may not generalize well across attribute values since the total number of devices which are associated with different attribute values may vary greatly depending on the attribute. Furthermore, the second approach considers one attribute value at a time and does not analyze attribute values for an attribute holistically.

Embodiments described herein use a holistic approach to commonalties analysis by comparing the distribution of impacted devices to the distribution of all devices within an attribute using a statistical technique called the chi-squared test. The chi-squared test may be used to determine if two probability distributions are the same or different with respect to each other.

A chi-squared hypothesis test (also known as the $\chi^2$ test) may be valid when the test statistic is chi-squared distributed under the null hypothesis. Specifically, the chi-squared test may be used to determine whether there is a statistically significant difference between two distributions (e.g., an expected distribution and an observed distribution). If the null hypothesis that there are no differences between the two distributions is true, then the test statistic computed from the observations follows a chi-squared distribution. The p-value for the chi-squared statistic represents the probability that the two distributions match each other (i.e., the p-value represents the probability that the null hypothesis is true).

The chi-squared statistic may be computed using the following expression:

$$\chi^2 = \sum \frac{(\text{Observed} - \text{Expected})^2}{\text{Expected}}$$

where $\chi^2$ is the value of the chi-squared statistic, and the sum is computed over the set of attribute values that is being used in the test. The value of the chi-squared statistic may then be used to compute the p-value based on the chi-squared distribution for the given degrees of freedom (which may be equal to one less than the cardinality of the set of attribute values that is being used in the test).

Figure 2:
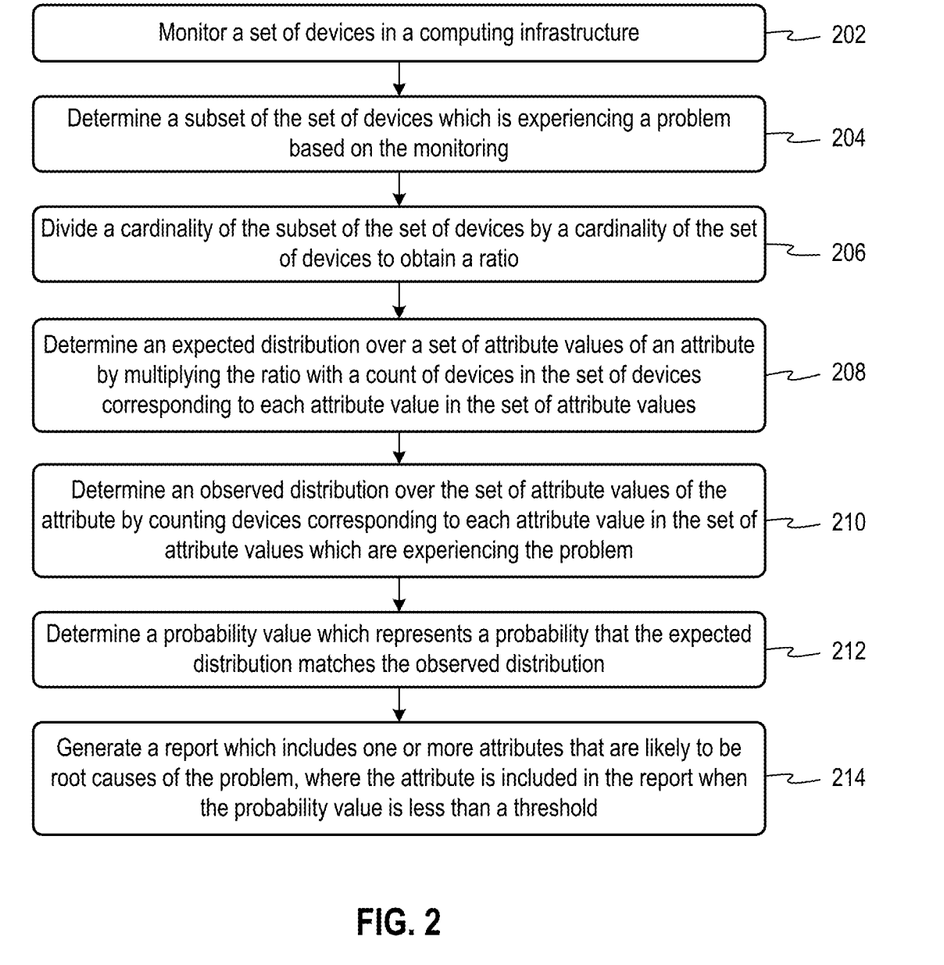
FIG. 2 illustrates a process for determining commonalities in devices by using a chi-squared statistical test in accordance with some embodiments described herein.

FIG. 2 illustrates a process for determining commonalities in devices by using a chi-squared statistical test in accordance with some embodiments described herein.

A set of devices may be monitored in a computing infrastructure (at 202). A subset of the set of devices which is experiencing a problem may be determined based on the monitoring (at 204). Specifically, monitoring software code executing on a device may monitor the device. The monitoring software code may determine performance metrics and may provide the performance metrics to a server, which may store performance metrics for a set of devices in the computing infrastructure. Examples of performance metrics include, but are not limited to, processor utilization, memory utilization, bandwidth utilization, response latency for applications, and other metrics which may be used to determine the health of the device. The performance metrics may be used to determine the subset of the set of devices which is experiencing a problem. For example, a set of performance metrics may define a multi-dimensional space, and a region in the multi-dimensional space may correspond to a normally behaving device. If the performance metrics for a device correspond to a point which is outside the normal region, then it may be determined that the device is experiencing a problem.

Figure 3:
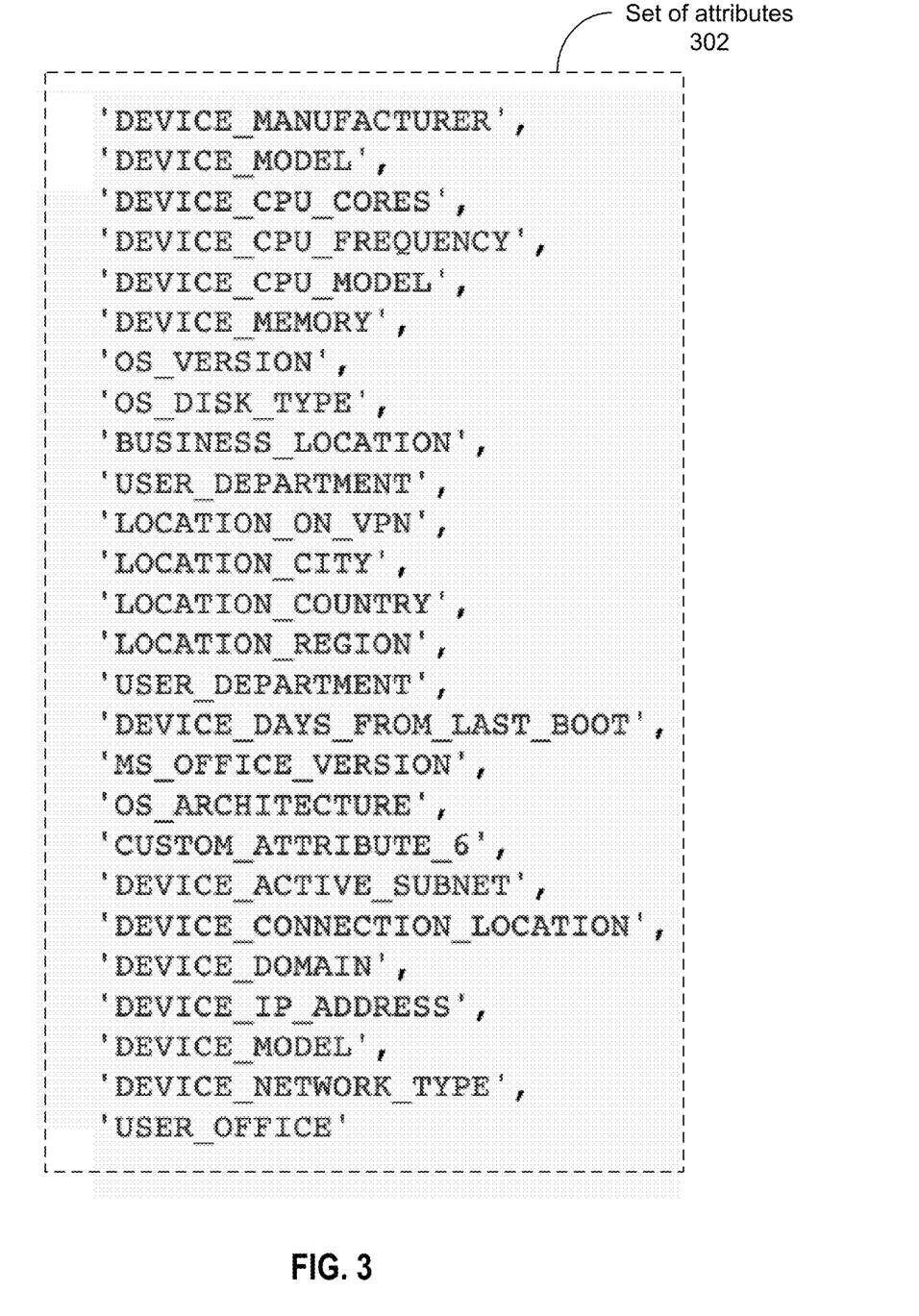
FIG. 3 illustrates a set of attributes in accordance with some embodiments described herein.

FIG. 3 illustrates a set of attributes in accordance with some embodiments described herein.

Each monitored device may be associated with a set of attributes which correspond to the identity of the device, the environment in which the device is being used, and/or how the device is being used in the environment. For example, set of attributes 302 may be determined for one or more devices in a computing infrastructure. Set of attributes 302 have been shown for illustration purposes only and are not intended to limit the scope of the disclosure. Devices may have fewer or more attributes than those shown in FIG. 3. In some embodiments described herein, at least some of the set of attributes 302 may be obtained by the monitoring software.

An attribute may be static or dynamic. A static attribute does not change depending on how and/or where the device is used. Examples of static attributes include, but are not limited to, a manufacturer of a device, a model of a device, a count of processor cores in the device, a clock frequency of a processor in the device, a processor model of a processor in the device, a type of memory used in the device, an amount of memory used in the device, a type of software used in the device, a version of a software used in the device, and a type of disk drive used in the device.

A dynamic attribute may change depending on how and/or where the device is used. Examples of dynamic attributes include, but are not limited to, a location of the device, an organization name which owns the device, a network address of the device, a network domain of the device, and a type of network connected to the device.

A cardinality of the subset of the set of devices may be divided by a cardinality of the set of devices to obtain a ratio (at 206). For example, if the set of devices includes 100 devices, and the subset of the set of devices includes 40 devices (i.e., 40 devices out of the 100 devices are experiencing a problem), then the ratio of 40/100=0.4 would be obtained.

An expected distribution may be determined over a set of attribute values of an attribute by multiplying the ratio with a count of devices in the set of devices corresponding to each attribute value in the set of attribute values (at 208). Continuing with the above example, if 50 devices out of the 100 devices have the attribute value V1, then the result of multiplying the ratio with the count of devices in the set of devices corresponding to the attribute value V1 would be 50*0.4=20 devices. In the expected distribution, a count of 20 may correspond to the attribute value V1.

An observed distribution may be determined over the set of attribute values of the attribute by counting devices corresponding to each attribute value in the set of attribute values which are experiencing the problem (at 210). Continuing with the above example, if 38 devices have the attribute value V1 and are experiencing the problem, then, in the observed distribution, a count of 38 may correspond to the attribute value V1.

The same device may be counted multiple times if the device is associated with multiple attribute values of a dynamic attribute. In other words, the attribute values for the devices may be processed so that if the same device is associated with different dynamic attribute values, then each of those instances of the device may be treated as a distinct entry. For example, if the same device is used in two different locations, and in each location if the device has two different Internet Protocol (IP) addresses, then this device may be counted four times (i.e., the database may include four separate entries for the same device): one entry for each location and IP address combination.

Figure 4A:
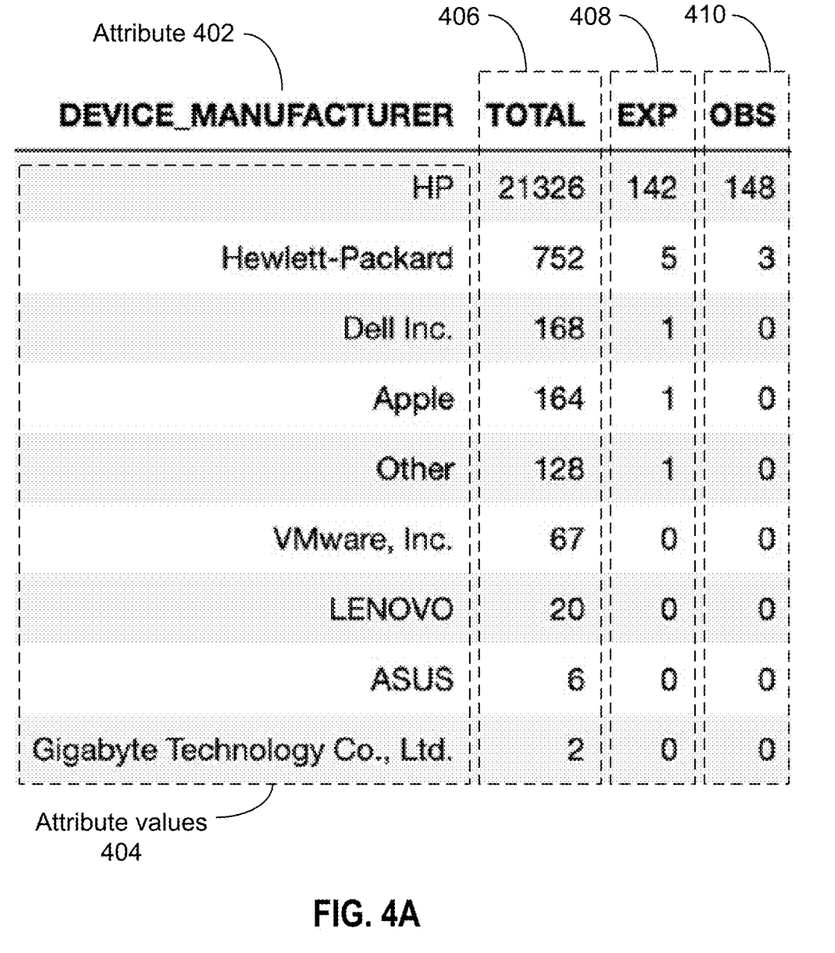
FIGS. 4A-4B illustrate an expected and an observed distribution in accordance with some embodiments described herein.
Figure 4B:
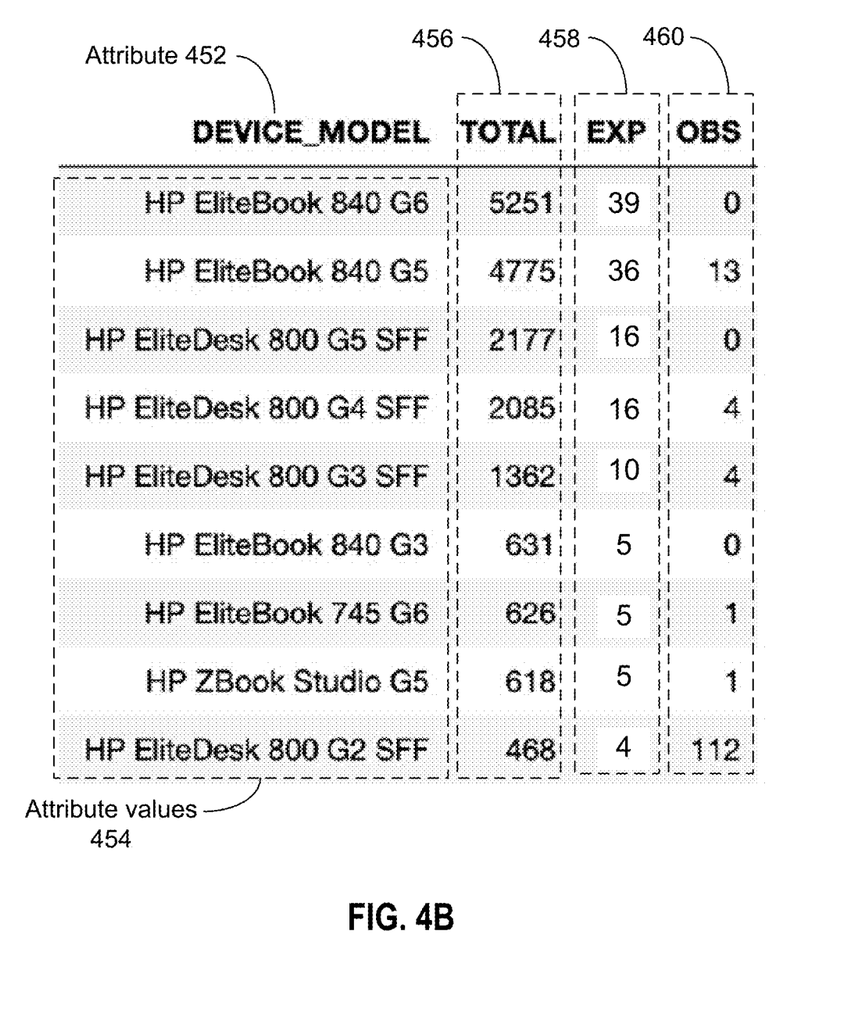

FIGS. 4A-4B illustrate an expected and an observed distribution in accordance with some embodiments described herein.

In FIG. 4A, attribute 402, i.e., "DEVICE_MANUFACTURER," may have a set of attribute values 404. Column 406 may include the number of devices which have a specific attribute value. For example, 21,326 devices from a total of 22,633 devices (22,633 is the sum of the values in column 406) have the attribute value "HP" for the attribute "DEVICE_MANUFACTURER", 752 devices from the total of 22,633 devices have the attribute value "Hewlett-Packard" for the attribute "DEVICE_MANUFACTURER," and so forth. Column 408 may include the number of devices which have a specific attribute value, and which are expected to have a problem. Specifically, a total of 151 devices (151 is the sum of the values in column 410) from the total of 22,633 may be identified as having a problem. Next, the ratio (151/22,633) may be multiplied with the number of devices which have a specific attribute value to obtain the quantities shown in column 408. For example, (151/22,633)×21,326=142 (rounded to the closest integer), which is the number of devices with the attribute value "HP" that are expected to experience a problem. Column 410 may include the number of devices which have a specific attribute value and are observed to be experiencing a problem (e.g., based on the performance metrics). For example, 148 devices with the attribute value "HP" may be experiencing a problem, e.g., the number of crashes per day of a particular software application may be greater than a given threshold.

In FIG. 4B, attribute 452, i.e., "DEVICE_MODEL," may have a set of attribute values 454. Column 456 may include the number of devices which have a specific attribute value. For example, 5,251 devices from a total of 17,993 devices (17,993 is the sum of the values in column 456) have the attribute value "HP EliteBook 840 G6" for the attribute "DEVICE_MODEL", 4,775 devices from the total of 17,993 devices have the attribute value "HP EliteBook 840 G5" for the attribute "DEVICE_MODEL," and so forth. Column 458 may include the number of devices which have a specific attribute value, and which are expected to have a problem. Specifically, a total of 135 devices (135 is the sum of the values in column 460) from the total of 17,993 may be identified as having a problem. Next, the ratio (135/17,993) may be multiplied with the number of devices which have a specific attribute value to obtain the quantities shown in column 458. For example, (135/17,993)×5251=39 (rounded to the closest integer), which is the number of devices with the attribute value "HP EliteBook 840 G6" that are expected to experience a problem. Column 460 may include the number of devices which have a specific attribute value and are observed to be experiencing a problem (e.g., based on the performance metrics). For example, 0 devices with the attribute value "HP EliteBook 840 G6" may be experiencing a problem. The sum of the values (i.e., 17,993) in column 456 in FIG. 4B may not be equal to the first entry (i.e., the entry corresponding to "HP" which is 21,326) in column 406 in FIG. 4A. Such differences in the data may occur due to one or more reasons which include, but are not limited to, (1) some data may be intentionally excluded from the analysis, and (2) some devices may be counted multiple times in the analysis because, e.g., the device is associated with multiple attribute values of a dynamic attribute.

A probability value may be determined which represents a probability that the expected distribution matches the observed distribution (at 212). A report may be generated which includes one or more attributes that are likely to be root causes of the problem, where the attribute is included in the report when the probability value is less than a threshold (at 214).

In some embodiments described herein, the expected distribution and the observed distribution may be provided to a chi-squared test, and the resulting chi-squared test p-value may be used to determine whether the expected distribution matches the observed distribution. If the expected distribution looks similar to the observed distribution, then the chi-squared test should confirm the similarity. The chi-squared p-value can take on values between 0 and 1. Specifically, if the chi-squared test p-value is less than a threshold value (examples of the threshold value include, but are not limited to, 0.01, 0.05, or 0.10), then the device attribute can be considered to be an actionable attribute to surface to the customer as a potential root cause of the problem.

For example, in FIG. 4A, the quantities in column 408 represent the expected distribution and the quantities in column 410 represent the observed distribution. The chi-squared test p-value for the expected distribution and the observed distribution may be 0.99998, which indicates that the distributions closely match each other. It may be determined that the attribute "DEVICE_MANUFACTURER" is not an actionable attribute and may not be identified as a root cause because the chi-squared test p-value (e.g., 0.99998) is greater than the threshold (e.g., 0.01).

In FIG. 4B, the quantities in column 458 represent the expected distribution and the quantities in column 460 represent the observed distribution. The chi-squared test p-value for the expected distribution and the observed distribution may be $3.35 \times 10^{-311}$, which indicates that the distributions are not a match. Specifically, the p-value is very close to 0, which means that the two distributions are very different from each other. Therefore, the attribute "DEVICE_MODEL" may be identified as a root cause because the chi-squared test p-value (e.g., $3.35 \times 10^{-311}$) is less than the threshold (e.g., 0.01). The data shown in FIG. 4B supports this conclusion. For example, only 4 HP EliteDesk 800 G2 SFF devices are expected to experience the problem (e.g., a more frequent application crash), but 112 devices of this model were observed to experience the problem.

The customer may use the generated report which identifies the HP EliteDesk800 G2 SFF device models as a root cause to further investigate the problem. Without this report, the customer would have had to investigate all devices without focusing on a specific model. Specifically, the report provides the following insights to the customer: (1) the root cause is not tied to the device manufacturer, but rather the device model, and (2) a disproportionately greater proportion of the HP EliteDesk800 G2 SFF device models experience the problem.

Figure 5:
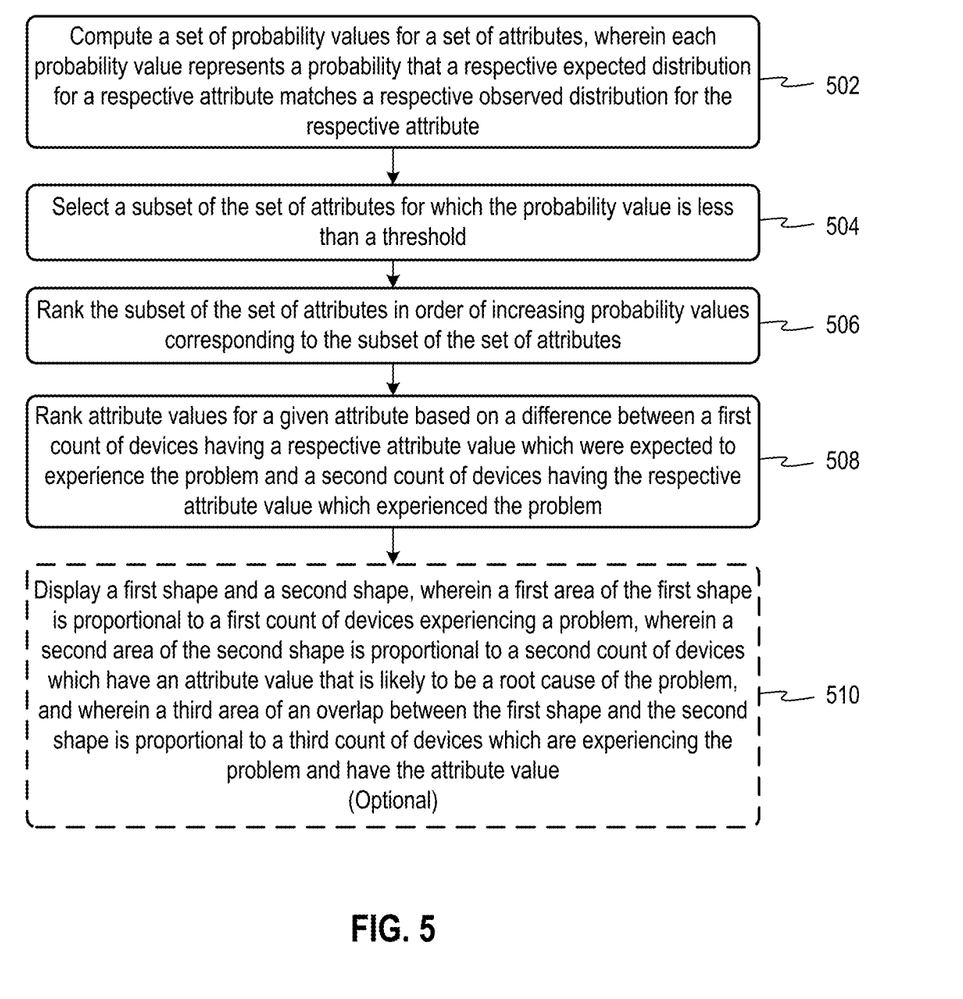
FIG. 5 illustrates a process for generating a report and optionally a display of potential root causes in accordance with some embodiments described herein.

FIG. 5 illustrates a process for generating a report and optionally a display of potential root causes in accordance with some embodiments described herein.

A set of probability values may be computed for a set of attributes, wherein each probability value represents a probability that a respective expected distribution for a respective attribute matches a respective observed distribution for the respective attribute (at 502). For example, the expected and observed distributions may be determined for each attribute shown in FIG. 3, and the chi-squared test p-value for each attribute may be determined.

A subset of the set of attributes may be selected for which the respective probability values are less than a threshold (at 504). Specifically, the smaller the chi-squared p-value, the stronger is the evidence of disproportions (i.e., a mismatch) between expected and observed distributions. For example, only those attributes may be selected for which the probability values are less than 0.01 (or any other suitable threshold).

The subset of the set of attributes may be ranked based on increasing probability values (at 506). Attribute values for a given attribute may be ranked based on a difference between a first count of devices having a respective attribute value which were expected to experience the problem and a second count of devices having the respective attribute value which experienced the problem (at 508). Specifically, only those attribute values may be shown where the observed number of impacted devices (i.e., devices which are experiencing a problem) is greater than the expected number of impacted devices. The attribute values may be ranked in descending order of the difference between the observed and expected values.

Figure 6:
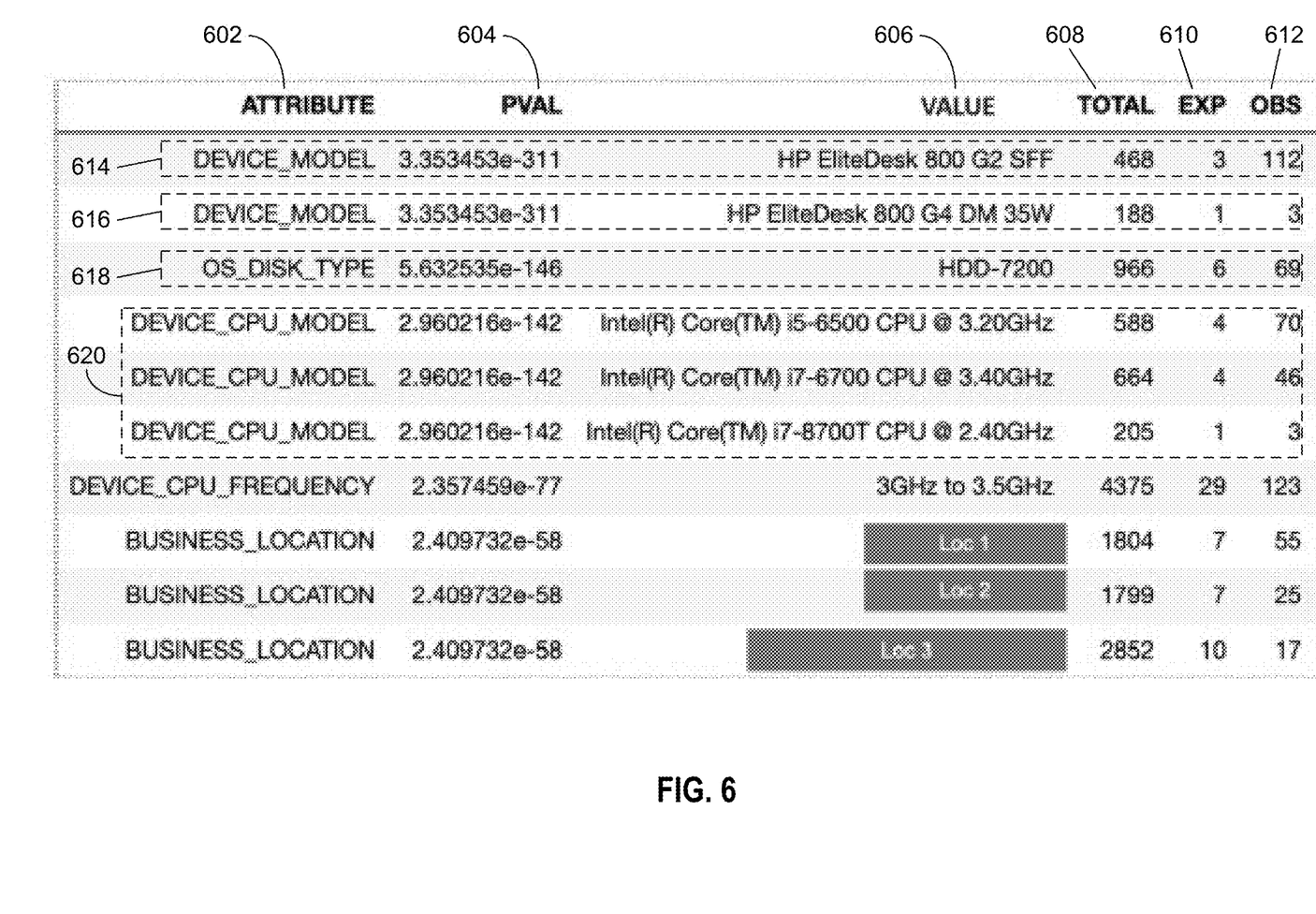
FIG. 6 illustrates a report in accordance with some embodiments described herein.

FIG. 6 illustrates a report in accordance with some embodiments described herein.

Column 602 includes the top five attributes (e.g., selected from set of attributes 302 shown in FIG. 3) with chi-squared test p-values (column 604) less than 0.01, and ranked by increasing p-values (i.e., the smaller the p-value the higher the rank). For each of the top five attributes, column 606 shows the top three attribute values that have the largest positive discrepancies between the observed and expected values. In other words, within an attribute, the attribute values are ranked in decreasing order of the discrepancy between the observed minus expected values. For example, row 614 is ranked higher than row 616 because the observed minus expected value (112−3=109) in row 614 is greater than the observed minus expected value (3−1=2) in row 616.

Row 618 corresponds to attribute "OS_DISK_TYPE" which includes only one attribute value (i.e., "HDD-7200") as opposed to rows 620 which corresponds to attribute "DEVICE_CPU_MODEL" and includes three attribute values. This is because "HDD-7200" was the only attribute value that had an observed value (i.e., the value in column 612) which was greater than the expected value (i.e., the value in column 610) across all possible OS disk type attribute values.

Embodiments described herein can automatically sift through all attributes and identify actionable commonalities. The generated report (e.g., the report shown in FIG. 6) indicate that a subset of specific device models with specific disk types, CPU models, CPU frequencies, and in specific business locations are disproportionately experiencing the problem (e.g., more frequent application crashes). Based on the report, the customer may determine that the problem is occurring on old devices and may decide to update the small subset of devices identified in FIG. 6 with newer models. Another report may surface the attribute "LOCATION_ON_VPN" with the attribute value of "TRUE" as an actionable attribute. In this case, the corrective action may be to investigate the network configuration with particular attention to the VPN connection or configuration. For example, the investigation may reveal an oversaturated network interface and the problem may be corrected by directing at least some of the network traffic to a new interface.

In some embodiments described herein, a first shape and a second shape may be optionally displayed, wherein a first area of the first shape is proportional to a first count of devices experiencing a problem, wherein a second area of the second shape is proportional to a second count of devices which have an attribute value that is likely to be a root cause of the problem, and wherein a third area of an overlap between the first shape and the second shape is proportional to a third count of devices which are experiencing the problem and have the attribute value (at 510).

Figure 7:
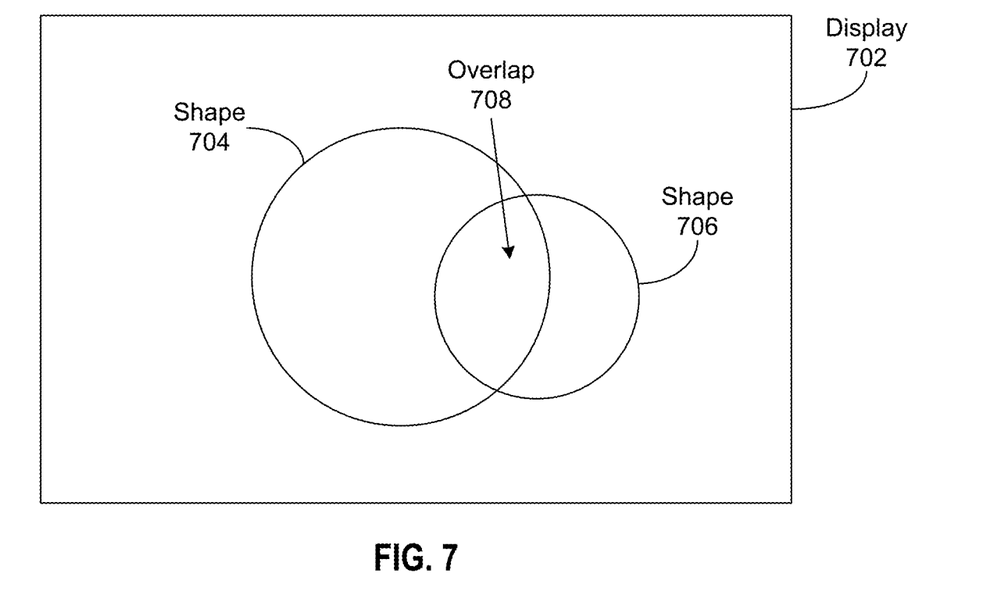
FIG. 7 illustrates a display in accordance with some embodiments described herein.

FIG. 7 illustrates a display in accordance with some embodiments described herein.

Shapes 704 and 706 may be displayed on display 702. The area of shape 704 may be proportional to the number of devices experiencing a problem and the area of shape 706 may be proportional to the number of devices which have an attribute value that is likely to be a root cause of the problem. The area of overlap 708 between shapes 704 and 706 may be proportional to the number of devices which are experiencing the problem and have the attribute value. Specifically, display 702 may be used to provide a visual representation of some of the data in the report (e.g., the report shown in FIG. 6).

Figure 8:
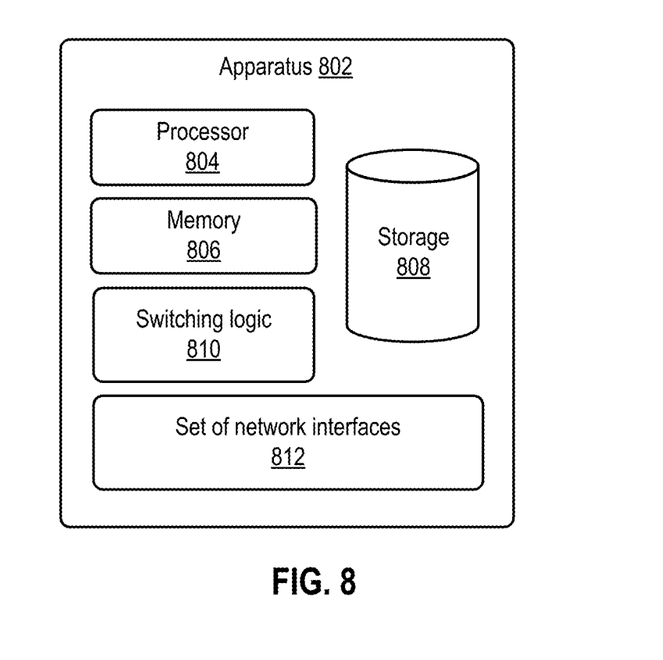
FIG. 8 illustrates an apparatus in accordance with some embodiments described herein.

FIG. 8 illustrates an apparatus in accordance with some embodiments described herein. Apparatus 802 (e.g., a device, a file server, etc.) can include processor 804, memory 806 (e.g., a volatile or non-volatile random access memory), and storage 808 (e.g., a flash memory device or a disk drive). Storage 808 can store data and executable code. The components in apparatus 802 can communicate with one another using a communication mechanism (not shown in FIG. 8), e.g., a bus, a backplane, and/or a switching fabric. Executable code stored in storage 808 can include instructions that, when executed by processor 804, cause apparatus 802 to perform one or more methods that are implicitly or explicitly described in this disclosure. Storage 808 can also store any data that is required by any processes that are performed by apparatus 802.

Apparatus 802 can also include switching logic 810 and set of network interfaces 812. Set of network interfaces 812 can be used to transmit data to and/or receive data from other communication devices. Switching logic 810 can forward network traffic received on one or more network interfaces in accordance with switching/forwarding/routing information stored in apparatus 802. Specifically, switching logic 810 can be configured by processor 804 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
monitoring a set of devices in a computing infrastructure;
determining a subset of the set of devices which is experiencing a problem based on the monitoring;
dividing a cardinality of the subset of the set of devices by a cardinality of the set of devices to obtain a ratio;
determining an expected distribution over a set of attribute values of an attribute by multiplying the ratio with a count of devices in the set of devices corresponding to each attribute value in the set of attribute values, wherein the attribute is a manufacturer of a device, a model of the device, a count of processor cores in the device, a clock frequency of a processor in the device, a processor model of a processor in the device, a type of memory used in the device, an amount of memory used in the device, a type of software used in the device, a version of a software used in the device, a type of disk drive used in the device, a location of the device, an organization name which owns the device, a duration since a most recent reboot of the device, a network address of the device, a network domain of the device, or a type of network connected to the device;
determining an observed distribution over the set of attribute values of the attribute by counting devices corresponding to each attribute value in the set of attribute values which are experiencing the problem;
determining a probability value corresponding to the attribute which represents a probability that the expected distribution matches the observed distribution; and
generating, by a processor, a report which includes one or more attributes that are likely to be root causes of the problem, wherein the attribute is included in the report when the probability value is less than a threshold.

2. The method of claim 1, wherein the determining the probability corresponding to the attribute which represents the probability that the expected distribution matches the observed distribution comprises computing a p-value for a chi-squared hypothesis test based on the expected distribution and the observed distribution.

3. The method of claim 1, wherein the counting devices corresponding to each attribute value in the set of attribute values which are experiencing the problem includes counting a first device multiple times when the first device is associated with multiple attribute values of a dynamic attribute of the first device.

4. The method of claim 1, wherein the generating the report includes ranking the one or more attributes in order of increasing probability values corresponding to the one or more attributes.

5. The method of claim 4, wherein the report includes an attribute value for a given attribute when a difference between a first count of devices having the attribute value which experienced the problem and a second count of devices having the attribute value which were expected to experience the problem is positive.

6. The method of claim 5, wherein the generating the report includes ranking one or more attribute values in order of decreasing respective differences corresponding to the one or more attribute values.

7. The method of claim 1, further comprising displaying a first shape and a second shape, wherein a first area of the first shape is proportional to a first count of devices experiencing the problem, wherein a second area of the second shape is proportional to a second count of devices which have a given attribute value of the attribute, and wherein a third area of an overlap between the first shape and the second shape is proportional to a third count of devices which are experiencing the problem and have the given attribute value.

8. A non-transitory computer-readable medium comprising stored instructions, which when executed by a processor, cause the processor to:
monitor a set of devices in a computing infrastructure;
determine a subset of the set of devices which is experiencing a problem based on the monitoring;
divide a cardinality of the subset of the set of devices by a cardinality of the set of devices to obtain a ratio;
determine an expected distribution over a set of attribute values of an attribute by multiplying the ratio with a count of devices in the set of devices corresponding to each attribute value in the set of attribute values;
determine an observed distribution over the set of attribute values of the attribute by counting devices corresponding to each attribute value in the set of attribute values which are experiencing the problem;
determine a probability value corresponding to the attribute which represents a probability that the expected distribution matches the observed distribution; and
generate a report which includes one or more attributes that are likely to be root causes of the problem, wherein the attribute is included in the report when the probability value is less than a threshold, wherein generating the report includes ranking the one or more attributes in order of increasing probability values corresponding to the one or more attributes, and wherein the report includes an attribute value for a given attribute when a difference between a first count of devices having the attribute value which experienced the problem and a second count of devices having the attribute value which were expected to experience the problem is positive.

9. The non-transitory computer-readable storage medium of claim 8, wherein the determining the probability value corresponding to the attribute which represents the probability that the expected distribution matches the observed distribution comprises computing a p-value for a chi-squared hypothesis test based on the expected distribution and the observed distribution.

10. The non-transitory computer-readable storage medium of claim 8, wherein the attribute of a device in the set of devices is a manufacturer of the device, a model of the device, a count of processor cores in the device, a clock frequency of a processor in the device, a processor model of a processor in the device, a type of memory used in the device, an amount of memory used in the device, a type of software used in the device, a version of a software used in the device, a type of disk drive used in the device, a location of the device, an organization name which owns the device, a duration since a most recent reboot of the device, a network address of the device, a network domain of the device, or a type of network connected to the device.

11. The non-transitory computer-readable storage medium of claim 8, wherein the counting devices corresponding to each attribute value in the set of attribute values which are experiencing the problem includes counting a first device multiple times when the first device is associated with multiple attribute values of a dynamic attribute of the first device.

12. The non-transitory computer-readable storage medium of claim 8, wherein the generating the report includes ranking one or more attribute values in order of decreasing respective differences corresponding to the one or more attribute values.

13. The non-transitory computer-readable storage medium of claim 8, wherein the instructions, which when executed by the processor, cause the processor to display a first shape and a second shape, wherein a first area of the first shape is proportional to a first count of devices experiencing the problem, wherein a second area of the second shape is proportional to a second count of devices which have a given attribute value of the attribute, and wherein a third area of an overlap between the first shape and the second shape is proportional to a third count of devices which are experiencing the problem and have the given attribute value.

14. An apparatus, comprising:
   a memory storing instructions; and
   a processor, coupled with the memory and to execute the instructions, the instructions when executed causing the processor to:
      monitor a set of devices in a computing infrastructure;
      determine a subset of the set of devices which is experiencing a problem based on the monitoring;
      divide a cardinality of the subset of the set of devices by a cardinality of the set of devices to obtain a ratio;
      determine an expected distribution over a set of attribute values of an attribute by multiplying the ratio with a count of devices in the set of devices corresponding to each attribute value in the set of attribute values, wherein the attribute is a manufacturer of a device, a model of the device, a count of processor cores in the device, a clock frequency of a processor in the device, a processor model of a processor in the device, a type of memory used in the device, an amount of memory used in the device, a type of software used in the device, a version of a software used in the device, a type of disk drive used in the device, a location of the device, an organization name which owns the device, a duration since a most recent reboot of the device, a network address of the device, a network domain of the device, or a type of network connected to the device;
      determine an observed distribution over the set of attribute values of the attribute by counting devices corresponding to each attribute value in the set of attribute values which are experiencing the problem;
      determine a probability value corresponding to the attribute which represents a probability that the expected distribution matches the observed distribution by computing a p-value for a chi-squared hypothesis test based on the expected distribution and the observed distribution; and
      generate a report which includes one or more attributes that are likely to be root causes of the problem, wherein the attribute is included in the report when the probability value is less than a threshold.

15. The apparatus of claim 14, wherein the counting devices corresponding to each attribute value in the set of attribute values which are experiencing the problem includes counting a first device multiple times when the first device is associated with multiple attribute values of a dynamic attribute of the first device.

16. The apparatus of claim 14, wherein the generating the report includes ranking the one or more attributes in order of increasing probability values corresponding to the one or more attributes.

17. The apparatus of claim 16, wherein the report includes an attribute value for a given attribute when a difference between a first count of devices having the attribute value which experienced the problem and a second count of devices having the attribute value which were expected to experience the problem is positive, wherein the generating the report includes ranking one or more attribute values in order of decreasing respective differences corresponding to the one or more attribute values.

\* \* \* \* \*